United States Patent [19]

Farnham

[11] 4,421,723
[45] Dec. 20, 1983

[54] METHOD AND APPARATUS FOR SUPPORTING RADIAL REACTOR CENTERPIPES TO ACCOMMODATE THERMAL CYCLING

[75] Inventor: Robert A. Farnham, San Rafael, Calif.

[73] Assignee: Chevron Research Company, San Francisco, Calif.

[21] Appl. No.: 400,119

[22] Filed: Jul. 20, 1982

[51] Int. Cl.³ .......................... B01J 8/02; B01J 35/02
[52] U.S. Cl. .................................... 422/218; 208/146; 285/24
[58] Field of Search ............... 422/218, 220, 222, 232, 422/233, 310, 311; 208/146; 285/18, 24, 31, 32, 397, 403

[56] References Cited

U.S. PATENT DOCUMENTS

| | | | |
|---|---|---|---|
| 2,037,812 | 4/1936 | McKendrick | 285/397 X |
| 2,634,194 | 4/1953 | Nebeck | 422/218 |
| 2,683,654 | 7/1954 | Bergman | 422/218 |
| 2,886,517 | 5/1959 | Patton et al. | 208/146 X |
| 3,027,244 | 3/1962 | Byrne et al. | 422/218 |
| 3,167,399 | 1/1965 | Hansen, Jr. | 422/218 X |
| 3,788,676 | 1/1974 | Lossie | 285/397 X |
| 4,032,177 | 6/1977 | Anderson | 285/24 |
| 4,276,265 | 6/1981 | Gillespie | 422/218 X |
| 4,374,095 | 2/1983 | Legg et al. | 422/218 |

FOREIGN PATENT DOCUMENTS

132723 10/1978 Fed. Rep. of Germany ...... 422/218

*Primary Examiner*—Richard L. Chiesa
*Attorney, Agent, or Firm*—Burns, Doane, Swecker & Mathis

[57] ABSTRACT

In a radial flow catalytic reactor, a centerpipe is gravity supported in a central socket member and accommodated as to vertical upward movement within a predetermined maximum distance to prevent unseating of the centerpipe due to thermal cycling of the catalyst and/or the reactor internal members.

Such vertical movement of the centerpipe is accommodated by extending the length of the socket member so that it exceeds the expected lift distance of the centerpipe due to such cycling.

Desirably, but not necessarily, the centerpipe may include a perforated pipe member axially coextensive with and enclosed within the screen member. The pipe and screen members are independently supported in the socket member by gravity.

12 Claims, 4 Drawing Figures

METHOD AND APPARATUS FOR SUPPORTING RADIAL REACTOR CENTERPIPES TO ACCOMMODATE THERMAL CYCLING

FIELD OF THE INVENTION

This invention relates to radial flow catalytic reactors. More particularly it relates to a method of and apparatus for operating a radial flow reactor to accomodate vertical movement of a gravity supported, uniformly permeable centerpipe due to change of temperature of the centerpipe fluids, catalyst and/or portions of the vessel structure during heating and cooling of such catalytic reactors.

DESCRIPTION OF THE PRIOR ART

It is a particular object of the invention to accomodate vertical movement of a centerpipe in a radial flow catalytic reactor over a predetermined distance which does not exceed the expected lift distance due to such thermal cycling. In general, the "internals" of such radial flow reactors are gravity supported in a vertically elongated vessel and all such internals are inserted and removed through an enlarged opening, such as a manway, in the upper wall of the vessel. ("Internals" as used herein refers to the centerpipe, catalyst particles, and catalyst retaining screens forming the catalyst bed and providing annular space between the outer circumference of the bed and the reactor vessel sidewall including any insulating structure.) Where such a radial flow reactor operates at elevated temperatures, it is frequently desirable to insulate the interior wall of the vessel so that the outer steel wall operates near ambient temperature conditions. To avoid heat conduction from the vessel internals to the vessel walls, all such internals must be essentially gravity supported except for a few low thermal conductivity paths (e.g., thin web supports and the like), which may be welded to a vessel nozzle or entry pipe in the bottom wall of the vessel. Further, the depth of the socket support for the centerpipe is as short as possible while still permiting use of the full vertical height of the reactor for radial flow through the catalyst bed.

Additionally, where radial reactors are used for hydroprocessing hydrocarbons, hydrogen is used to influence cracking, isomerization or reforming of such hydrocarbons. To contain the hydrogen and prevent hydrogen embrittlement of the steel vessel walls (due to hydrogen interaction with carbon in the steel) it is usually necessary to heat-treat such reactor vessels (frequently 60 to 100 feet long and up to 30 feet in diameter) as a single unit. After such heat treatment it is undesirable to affix, as by welding, any portion of the internals to that vessel. For this additional reason, such catalyst retaining members are gravity supported in the vessel.

In radial flow reactors, fluid reactant generally enters the top of the vessel, flows downwardly in the annular space between the outer catalyst retaining screens and the vessel wall, and then passes radially inward through the catalyst bed to a perforated centerpipe. Fluid in the centerpipe then leaves through an outlet at the bottom of the vessel. Alternatively, flow into the vessel may be inverted so that reactant enters the bottom periphera of the vessel, flows upwardly in the annular space between the vessel wall and catalyst bed, passes through the bed and leaves through a centerpipe communicating with a central lower outlet. Reverse flow is also possible. In such an arrangement, inlet flow of reactant fluids is upwardly in the centerpipe, radially outward through the catalyst bed and out of the top of the vessel.

As mentioned above, conventional radial reactors are usually subjected to temperature cycling, an alternate increase and decrease in the temperature of the vessel and its contents. The cycles are frequently from 200° to 500° C. or more in magnitude. Temperature cycling occurs, for instance, when an apparatus is heated and brought into service at an elevated operating temperature and subsequently withdrawn from service and cooled. Temperature cycling also occurs when contact material in the vessel is regenerated at an elevated temperature, or when there is a change in feed rate or a power outage. Apparatus employed in catalytic hydrocarbon conversion processes such as reforming, isomerization, hydrodesulfurization and hydrocracking are especially subject to temperature cycling. Because centerpipes of radial flow vessels of conventional design are removable, the centerpipe tends to move vertically upward in the bed of catalyst material with each temperature cycle.

The reasons for such net upward movement of the centerpipe is not completely understood. Apparently, the centerpipe upon being heated expands in an upward direction. But upon being cooled, it contracts from both ends toward a center neutral point. Thus, with each cycle, there is a net upward movement, frequently up to 1 centimeter or more. Eventually the centerpipe will rise enough from its mounting socket, or seat, to allow unwanted movement of the contact material. If the centerpipe moves away from the seat at the base of the vessel, contact material will flow under it, escape from the vessel and enter subsequent vessels such as heat exchangers. There the contact material can adversely affect fluid flow distribution or contacting efficiency, or shut down flow completely. Displacement of the catalyst obstructs flow of the reactant which can cause coking and damaging local temperature rises. A further effect of a rise of the centerpipe is to decrease the depth of the contact material seal above the top perforation in the centerpipe. The decreased seal allows some of the feed to bypass the contact material, which leads to loss of product quality.

One arrangement for restraining centerpipe movement is shown and described in U.S. Pat. No. 4,244,922, issued Jan. 13, 1981, assigned to the assignee of this application. In that patent a horizontal surface is secured to the centerpipe in such a position that it carries a portion of the weight of the catalyst bed. The horizontal surface is in the form of a disk which either is secured to the pipe or rests upon a flange affixed to the centerpipe. This arrangement is quite satisfactory to prevent centerpipe vertical movement but presents some problems. If the flange is permanently fixed to the centerpipe, as by welding, the increased diameter interferes with insertion and removal of the pipe through the vessel manway. Further it may interfere with visual alignment and landing of the base of the centerpipe in the vessel support socket.

U.S. Pat. No. 4,033,727—Vautarin, issued July 5, 1977; U.S. Pat. No. 3,167,399—Hansen, issued Jan. 26, 1965 and U.S. Pat. No. 3,027,244—Byrne et al, issued Mar. 27, 1962, each discloses radial flow reactors having uniform diameter centerpipes which appear to be gravity supported on the bottom wall of the vessel, but without means for accommodating upward movement of the centerpipe sufficient to prevent unseating and catalyst loss from the vessel.

U.S. Pat. No. 2,997,374—Lavender et al, issued Aug. 22, 1961 discloses a radial flow reactor in which the centerpipe is permanently secured to the bottom wall of the reactor, vessel.

U.S. Pat. No. 2,635,989—Bonner, issued Apr. 21, 1953 discloses a radial flow reactor in which the centerpipe enters either the top or bottom of the reactor and is composed of a vertical series of cones or cylinders of decreasing diameter from the inlet to the outlet end of the vessel. The centerpipe is permanently affixed to the end wall of the reactor vessel.

In my prior U.S. patent application Ser. No. 316,522 filed Oct. 29, 1981, now U.S. Pat. No. 4,374,094 which is assigned to the assignee of the present invention, there is disclosed method and apparatus for preventing centerpipe lifting by forming the centerpipe with a uniformly permeable frustroconical configuration. The structure is preferably a gravity seated rigid screen member against which the weight of the catalyst particles bears to resist pipe lift.

Application Ser. No. 316,547, also filed on Oct. 29, 1981, now U.S. Pat. No. 4,374,095 and also assigned to the assignee of the present invention, discloses an alternate form of a frustroconically configured centerpipe in which an internal pipe is slotted or drilled and openings through the pipe are individually covered or the entire pipe is surrounded by screen means.

SUMMARY OF THE INVENTION

In accordance with the present invention uniform radial flow through the catalyst bed is through a cylindrical centerpipe which is supported in a socket, the length of which exceeds the expected axial distance that the centerpipe may rise under thermal cycling. Such lifting tendency of the centerpipe is also reduced by forming it as a generally rigid screen having uniform radial and longitudinal permeability. The centerpipe is permitted to lift within a predetermined maximum distance by suitably elongating the vessel socket for gravity support of the lower end of the centerpipe.

Preferably, the centerpipe is formed by uniformly permeable screen means in the form of vertical bars uniformly spaced apart around the circumference. The bars forming said rigid cylindrical screen member are so held by internal hoop members bonded to the vertical bars at longitudinally spaced intervals of approximately equal distances. In one form a cylindrical pipe member of smaller diameter than the centerpipe screen member is enclosed within it so that the pipe is radially inwardly spaced from said screen member to form a coaxially annular space with the screen member. In one preferred form, an upper cap member is secured to the upper end of said centerpipe screen to close the top thereof.

The socket member for the centerpipe also holds said rigid cylindrical screen member vertical and coaxial with the walls of the radial reactor vessel. Segments, or arcuate sections, of screens disconnectably attached to each other are placed adjacent the vessel sidewall to enclose a generally cylindrical bed of catalyst particles. Such segments likewise extend a desired distance above the centerpipe to assure that the top of the pipe is covered by catalyst particles to a desired depth. The top of the catalyst bed supports a plurality of arcuate plates, or segments, to vertically confine the bed. Further, the vertical screen segments are radially spaced inwardly from the vessel sidewall to provide an annular flow path along the length and around the circumference of the catalyst bed so that reactant may flow uniformly radially to or from the uniformly permeable centerpipe.

DETAILED DESCRIPTION OF THE PREFERRED EMBODIMENTS

Figure 1:
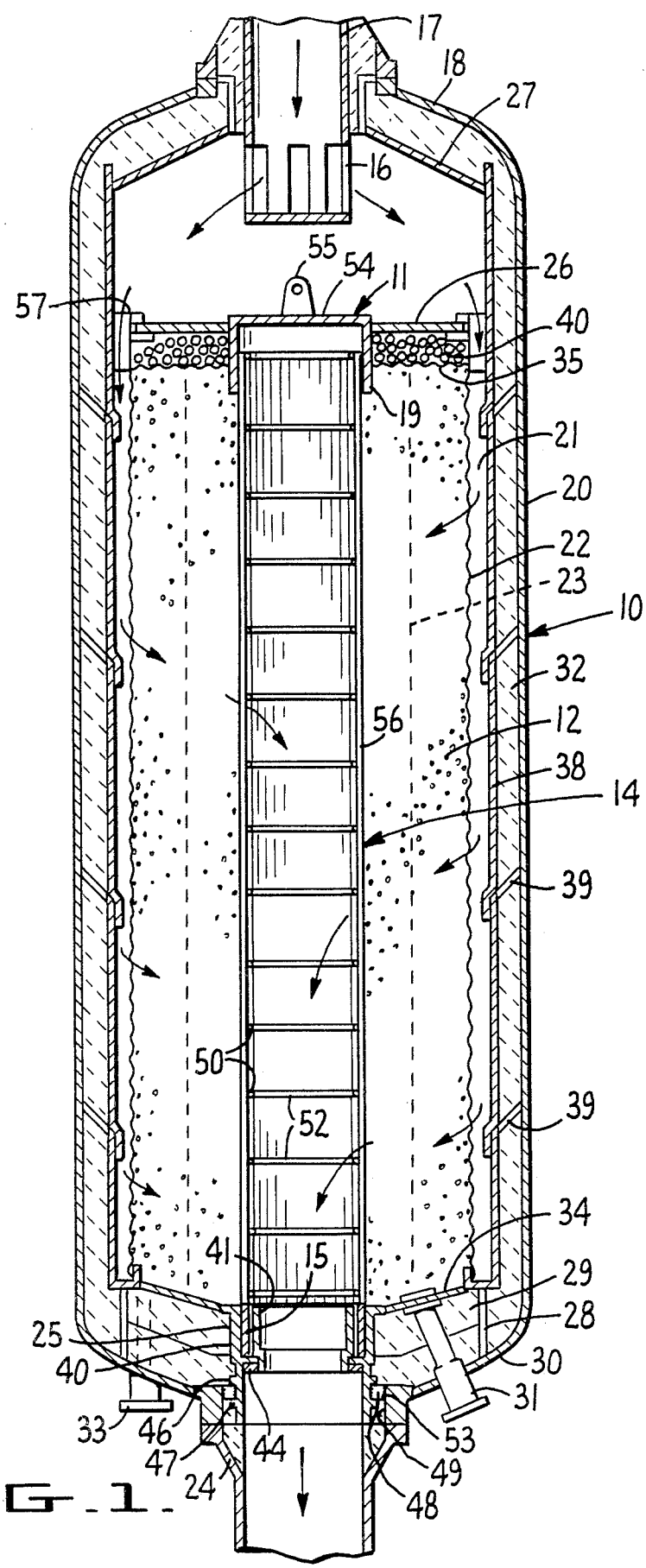
FIG. 1 is a vertical elevation view, partially in cross-section, of a radial reactor vessel suitable for performing the method of the present invention including a preferred embodiment of a uniformly permeable and rigid cylindrical screen member concentric with said vessel and having an elongated support socket.

Referring now to FIG. 1, a radial flow reactor vessel 10 supports a generally cylindrical bed 12 of catalyst particles. A uniformly permeable cylindrical centerpipe, screen member 14, constructed in accordance with my invention, extends vertically and axially through bed 12. Flow of hydrocarbons to be processed in bed 12 (as indicated by arrows) is from inlet distributor 16 in an enlarged central inlet opening 17 designated as a "manway" through upper end wall 18 of vessel 10, and into bed 12 from the annular space 21 between sidewall 20 of vessel 10 and the retaining screen means 22 for bed 12. Centerpipe screen means 14 preferably comprises an outer, uniformly permeable, screen means 56 extending from the vessel outlet formed by flange 24 in lower vessel end wall 30 toward upper vessel end wall 18. If desired, the permeability of screen member 56 may be increased at the top as compared to its base end.

Desirably the entire assembly of cylindrical centerpipe screen member 14, retainer screen means 22, formed by a plurality of segments 23, catalyst bed 12 and cover 26, likewise formed by segments, is supported by gravity on lower end wall 30 of vessel 10. In the arrangement of FIG. 1, vertical support ring 28 provides a base for screen segments 23. Because vessel 10 in the present embodiment is intended to operate as a cold wall reactor, an internal shell 38 is also mounted on support ring 28 and is spaced from outer wall 20 by canted annular rings 39. Rings 39 are vertically spaced apart, and as with ring 28, are relatively thin compared to their length to form low thermal conductive paths between shell 38 and outer vessel side wall 20. The internal reaction volume of vessel 10 is insulated from upper wall 18 by a spacer such as annular disc 27. The bottom, side and top of vessel 10 is then filled with insulative cement or aggregate 32 to provide the necessary insulation. The upper portion 29 of bottom insulation is preferably coarse sand, covered with plate means 34, also formed in segments. Plate means 34 provides a base for catalyst bed 12.

As discussed above, it is essential that all portions of the internals (apart from the thermal insulation means)

of vessel 10 be removable, as through manway 17 in upper end wall 18. For this reason cylindrical centerpipe screen member 14 must be removable. As will be apparent, the diameter of centerpipe screen 14 is somewhat exaggerated to illustrate its construction. However, the structure is such that its full diameter will readily pass through manway 17. To support centerpipe screen means 14 in a vertical position and substantially coaxial with vessel 10, a socket, or support seat 25 is supported within bottom outlet flange 24.

Figure 2:
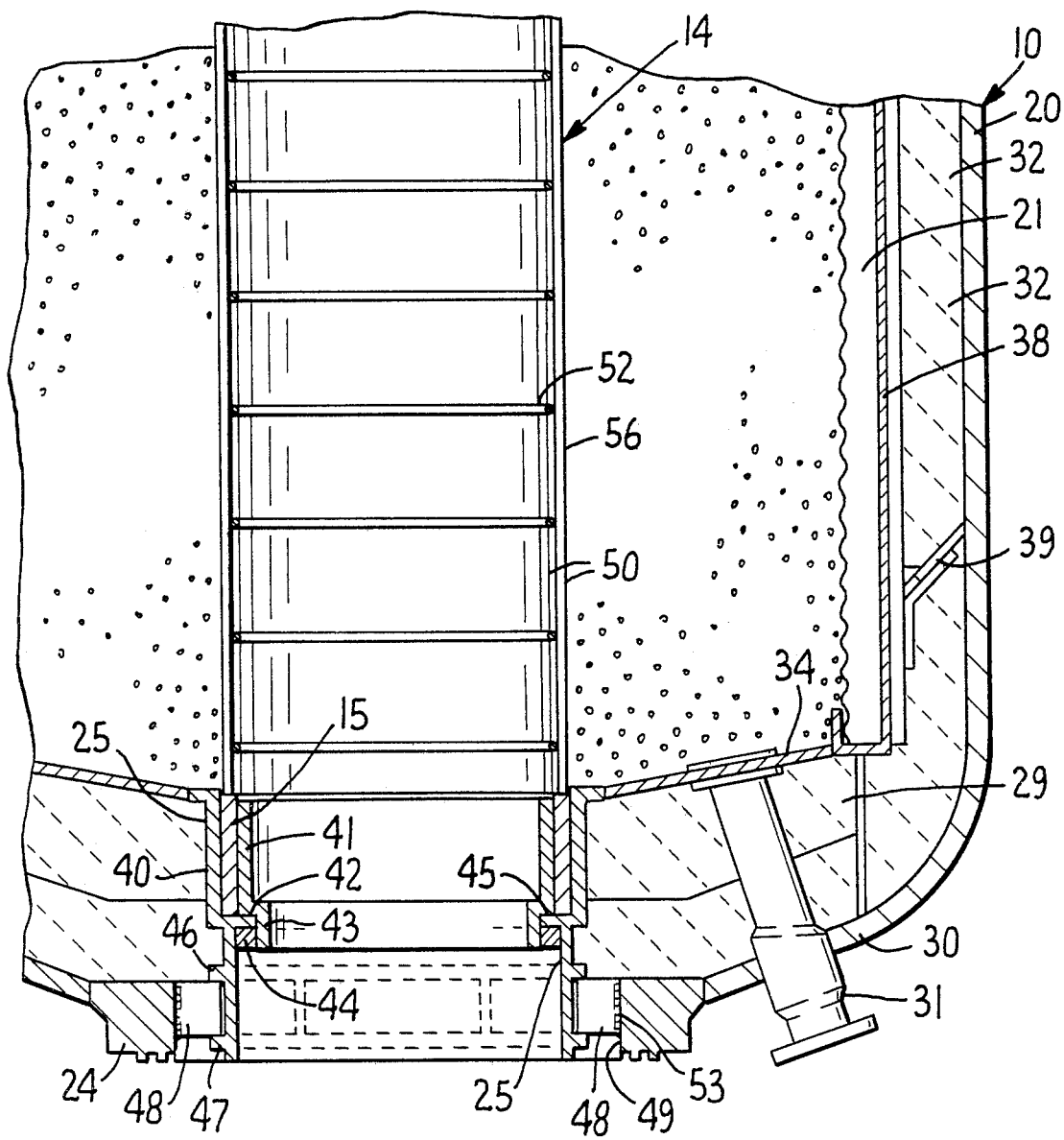
FIG. 2 is an enlarged cross-sectional elevation view of the lower end of the vessel and screen centerpipe arrangement shown in FIG. 1.

As best seen in FIG. 2, preferably, socket 25 is cylindrical with an annular seat 45 for collar 15 formed integral with the lower end of rigid centerpipe screen 14. A removable internal collar 41 includes a ring seat 42 which also rests on annular seat 45. A depending cylindrical skirt 43 permits internal collar 41 to be anchored in socket collar 25, as by lock ring 44, adapted to releasably engage skirt 43 and the inner surface of socket 25. For low thermal conductivity support in flange 24, socket 25 also includes a pair of external mounting collars 46 and 47. A plurality of radial ribs 48 are welded to the inner circumference of opening 49 in flange 24 of lower wall 30 of vessel 10 to secure socket 25 in place. It is to be particularly noted that ribs 48 are thin as compared to their radial length and are secured only to opening 49 by welds 53 to assure a low heat conductivity path from collars 46 and 47 of socket 25 to flange 24.

In the arrangement of FIGS. 1 and 2, desirably the lengths of socket 25 and internal collar 41, exceed expected actual lift distance of collar 15 of screen 14 due to thermal cycling during operation of vessel 10. Although socket 25 may be tapered outwardly a few degrees to assist insertion and removal of centerpipe means 14, in general it is preferably cylindrical along its length, to frictionally engage the outer surface of collar 15 at its lower end. If centerpipe means 14 "creeps" upward under variable thermal conditions, or thermal cycling, catalyst particles or fines that might enter socket 25 are prevented from reaching the outlet stream by removable internal collar 41. Collar 41 is made removable so that seat 45 may be cleaned if centerpipe member 14 is removed.

In the arrangement of FIG. 1, centerpipe screen means 14 is closed at the top by a cap member 11 which extends above the top of bed 12 and catalyst bed cover 26. Segments forming catalyst bed cover 26 lie directly on a layer of spheres or balls, 40 resting on screen 35. Together this arrangement closes off the top of bed 12. Since vertical movement of centerpipe means 14 would uncover the upper end of screen member 56 the side walls 19 of cap 11 are made sufficiently long so that reactant fluids will not bypass bed 12 with accompanying loss of efficiency or degradation of products. Top 54 of cap 11 may be provided with a lift eye 55 for use in installation or removal of centerpipe 14 through manway 17 by cable and lifting hook (not shown).

A significant advantage of the generally uniform cylindrical shape of screen 56 of centerpipe means 14 is to improve radial flow throughout bed 12. As particularly detailed in FIG. 2, the parallel vertical bars forming screen 56 are uniformly spaced and held by hoops 52 equally spaced along the ength of screen 56. It has long been appreciated that radial flow vessels are subject to considerable variations in flow over various parts of the entire cylindrical body of catalyst particles. Under relatively low flow conditions and uniform permeability of the catalyst bed, catalytic reaction in such reactors is highly efficient. However, with high flow rates and non-uniform permeabilites, fluids "channel" or "stratify" through selected flow paths, generally those paths with the greatest permeability. To accommodate such variations, the width of bars 50 and their spacing from each other can be varied as they are assembled and welded on hoops 52.

Figure 3:
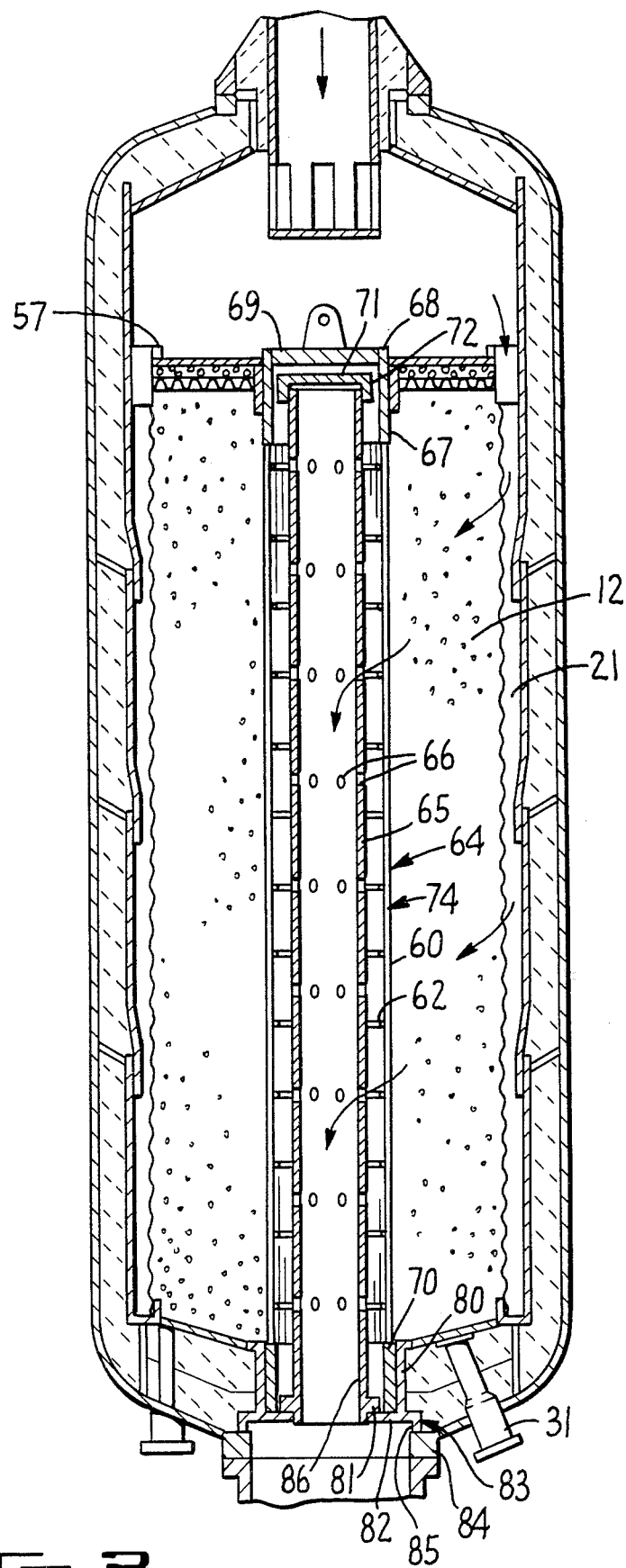
FIG. 3 is a cross-sectional elevation view of another alternate embodiment of the invention illustrating an arrangement for supporting a perforated pipe within a uniformly permeable cylindrical screen member seated in an elongated support socket.
Figure 4:
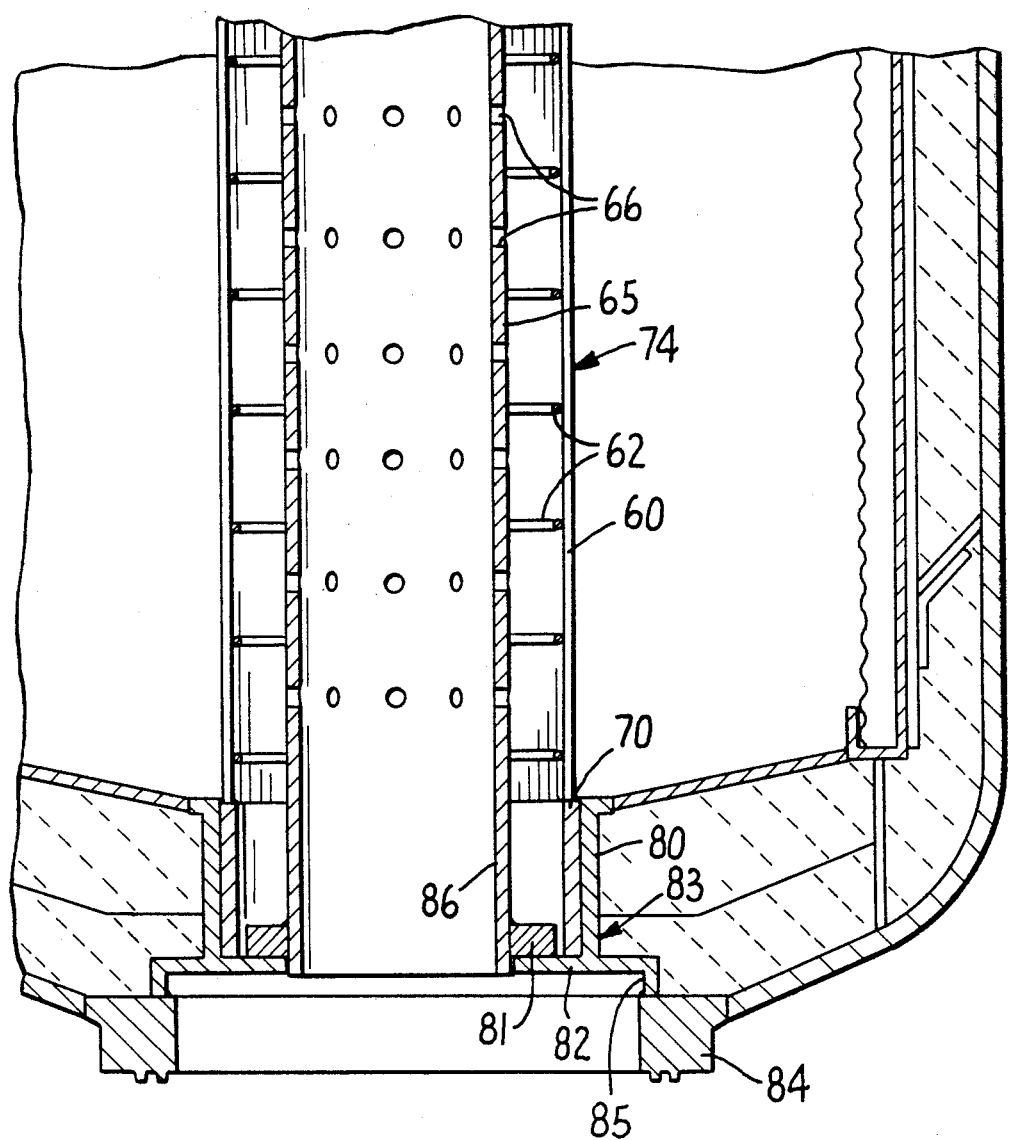
FIG. 4 is an enlarged vertical elevation view partially in cross-section of the lower end of the arrangement shown in FIG. 3.

FIGS. 3 and 4 show a further alternative embodiment of the present invention for accommodating centerpipe lifting. As there shown, centerpipe means 64 includes screen member 74 which encloses a smaller diameter pipe member 65 having slots, or holes, 66 formed therein to control flow of fluids throughout the cylindrical body of catalylst 12. As best seen in FIG. 3, a preferred form of cylindrical screen 74, (as in FIGS. 1 and 2) is a plurality of vertical bar members 60 equally spaced from each other and bonded to spaced apart hoop member 62, as by welding. For flow from annular space 21 to centerpipe 64, and to restrain catalyst movement during fluid flow, bars 60 are generally triangular in cross-section and arranged so that their wedge faces are directed inwardly so that there is greater clearance for flow at the inner face than at the outer face of centerpipe means 64. A specific advantage in such construction is to prevent plugging by small particles that may bridge the open spaces between the external faces of bars 60. Hoops 62 are spaced apart at suitable intervals along the length of centerpipe screen 74 to give structural stability against the hydrostatic head of the catalyst bed at each level along centerpipe 64.

Sidewall 67 of cap member 68 is welded to the upper end of screen member 74 so that cover 69 is above bed 12. Desirably perforated pipe 65 has a diameter substantially smaller than the inner diameter of screen member 74 and terminates in a closed cap 71 whose outer circumference 72 forms a slip fit wth the inner surface of sidewall 67 of cap 68. Cap 71 is positioned to accommodate differential thermal expansion between screen member 74 and perforated pipe 65. The socket end of screen member 74 is in the form of a collar 70 secured, as by welding, to the ends of screen bars 60.

Although not shown, screen member 74 may be formed by a multiplicity of circular members, of the same diameters between base collar 70 and sidewall 67 of upper cap 68, to obtain the uniform permeability. The circular members are then secured in their axially spaced apart positions by radially spaced rods extending between base collar 70 and cap 68.

In the arrangement of FIGS. 3 and 4, it will be particularly noted that socket sidewall 80 is elongated sufficiently to exceed any expected lift of collar 70 by screen member 74. Further it will be seen that the lower end of perforated pipe 65 includes a ring seat member 81 which lands on a radial extension of annular plate 82, formed as a part of socket member 83 and secured by web 85 so that socket 80 is concentric with vessel bottom flange 84. Preferably, the lower end 86 of perforated pipe 65 has no openings below the top of socket sidewall 80.

While only the FIGS. 3 and 4 embodiment of the invention includes a perforated pipe, such as 65, the arrangement of FIGS. 1 and 2 may also include such a pipe.

In the arrangements of both FIGS. 1 and 4, if desired, screen member 56 (FIG. 1) or screen 74 (FIG. 3) may be made up of several cylindrical portions of bars 50 or 60 and hoops 52 or 62, respectively, with each portion having a decreasing diameter and secured end to end to form a stepped, generally conical centerpipe. Such an arrangement may also include a perforated internal pipe, if so desired.

It is frequently desirable to be able to easily remove the catalyst bed before attempting regeneration of catalyst, or other servicing of reactor 10. For example in FIG. 1, catalyst particles may be drained through flange 31 which enters vessel 10 through bottom wall 30. Additionally flange 33 may be used to extract samples of catalyst particles during normal operation, as well as to assist in removing catalyst bed particles. After removal of the catalyst, the individual internal elements may be removed, (or installed). As shown, to assist in removal or installation of centerpipe member 14, a lifting lug or eye 55 is secured to upper end 11 (FIG. 1) or plate 69 (FIG. 3). Ring 57 holds the several pieshaped segments of cover 26 in place on balls 40 over screen 35.

The present embodiments of the invention have been described in connection with flow of hydrocarbons to be reacted in vessel 10 entering through flow distributor 16 and with effluent exiting through outlet flange 24. However, reverse flow into centerpipe member 14 and then radially outwardly through bed 12 to annular space 22 is possible with the attendant advantages of accommodating such centerpipe being for thermal movement to the extent required, while preventing movement of catalyst from bed 12 into the space between the centerpipe and its socket seat.

While only a few examples of the preferred embodiments of the invention have been shown and described, various other modifications or changes in both as to the method and apparatus aspects thereof will occur to those skilled in the art. All such modifications or changes coming within the scope of the appended claims are intended to be included therein.

I claim:

1. Method of assembling a hydroprocessing reactor wherein an axially elongated reactor vessel includes an internal structure permitting radial flow between the central portion of said vessel, said internal structure being formed by a plurality of elements, each of which is insertable or removable through an access opening in the upper wall of said vessel and each of said internal structure elements being supported by gravity on the lower end wall of said vessel, which comprises positioning a centralizing socket member to communicate with a flow passageway through said lower end wall of said vessel, seating the lower end of a centerpipe member in said socket member to centralize said centerpipe in said vessel and to extend it axially parallel to a substantial portion of the length of a sidewall of the vessel, said centerpipe member including a vertically elongated, constant diameter cylindrical screen member, said screen member having a portion of the surface uniformly permeable for fluid flow therethrough, the lower end of the screen member having an unperforated collar with a length coextensive with said socket member, enclosing within said screen member a perforated pipe havinq a length which is at least coextensive with said screen member, enclosing said centerpipe screen member within a body of catalyst particles extending outwardly from said screen member, externally confining said particles adjacent said vessel sidewall to form an annular vertical passageway between said vessel sidewall and the so formed cylindrical body of said catalyst particles to permit radial flow of reacting fluids from the cylindrical surface of said body to said centerpipe screen member, and accommodating axial lifting of said gravity supported centerpipe member from said socket member due to thermal cycling of said catalyst particles and/or said vessel internal elements by extending the length of said socket to exceed the expected maximum lift of said centerpipe member in said socket member.

2. Method of assembling a radial flow reactor in accordance with claim 1, wherein said socket member includes one portion for supporting said perforated pipe, said screen member being independently supported on another portion of said socket member.

3. A radial flow reactor for flowing a hydrocarbon fluid to be reacted with a solid contact material comprising:

a vertically elongated vessel having fluid inlet and outlet passageways formed therein;

a vertically elongated centerpipe member, having flow paths formed therethrough, said centerpipe member being vertically movable relative to said vessel, said centerpipe member including a vertically elongated cylindrical screen portion surrounding a perforated pipe havinq a length which is at least coextensive with said screen portion, a lower end of the screen portion having an unperforated collar with a length coextensive with socket means for independently seating the centerpipe member, means for retaining said solid contact material in a generally cylindrical body around said centerpipe member, said means for retaining being arranged around the periphery of said vessel and axially generally coextensive with said centerpipe member;

the socket means seating said centerpipe member therein by gravity for vertical insertion or removal of said centerpipe member relative to said vessel;

said socket having a length sufficient only to accommodate axial lifting of said gravity seated centerpipe member from said socket means within a predetermined distance due to process thermal cycling of said catalyst and/or said vessel internals, including said centerpipe member; and low heat conductive means for supporting said socket means on a lower wall of said vertically elongated vessel.

4. The radial flow reactor of claim 3, wherein said socket means includes a first portion for supporting said perforated pipe, and a second portion for independently supporting said screen portion.

5. The radial flow reactor of claim 3, wherein said centerpipe member includes an upper cap member, and said upper cap member is radially spaced from an upper end of said perforated pipe by an amount sufficient to permit vertical thermal expansion of the said perforated pipe during operation of said reactor without substantial movement of said centerpipe member.

6. The radial flow reactor of claim 3 wherein the upper end of said centerpipe member is covered by an upper cap member having solid side walls extending from within said catalyst bed to a level above said bed.

7. The radial flow reactor of claim 6 wherein said upper cap member is formed integral with said screen portion.

8. The radial flow reactor of claim 6 wherein the side wall of said upper cap member slidably engages the upper end of said screen portion and an upper end of said cap member is axially spaced from the upper end of said screen portion.

9. The radial flow reactor of claim 6, wherein said upper cap member is radially and axially spaced from the upper end of said perforated pipe by a an amout sufficient to permit vertical thermal expansion of said perforated pipe without substantial movement of said centerpipe member.

10. In a radial flow reactor for flowing a hydrocarbon fluid to be reacted with a solid contact material wherein said reactor comprises:

a vertically elongated vessel having fluid inlet and outlet passageways formed therein;

a vertically elongated centerpipe member, having flow paths formed therethrough, said centerpipe member being vertically movable relative to said vessel;

means for retaining said solid contact material in a generally cylindrical body around said centerpipe member, said means for retaining being arranged around the periphery of said vessel and axially generally coextensive with said centerpipe member;

socket means for independently seating said centerpipe member therein by gravity for vertical insertion or removal of said centerpipe member relative to said vessel; and low heat conductive means for supporting said socket means on a lower wall of said vertically elongated vessel;

the improvement comprising a centerpipe member having an elongated, uniformly permeable screen means formed by axially extending rods equally spaced circumferentially to permit substantially unimpeded flow between said rods, a lower end of the screen means including an imperforate collar member axially coextensive with said socket means and secured to a lower end of said rods, and said socket means having a length sufficient only to accommodate axial lifting of said gravity seated centerpipe member from said socket means within a predetermined distance due to process thermal cycling of said catalyst and/or said vessel internals, including said centerpipe member.

11. In a radial flow reactor in accordance with claim 10 wherein said centerpipe member additionally includes a perforated pipe member disconnected from the screen means and axially substantially coextensive with said screen means, said pipe being enclosed within said screen means at a spaced radial distance therefrom.

12. In a radial flow reactor in accordance with claim 11 wherein said socket includes means for independently supporting said screen means and said perforated pipe member.

* * * * *